United States Patent Office 3,426,331
Patented Feb. 4, 1969

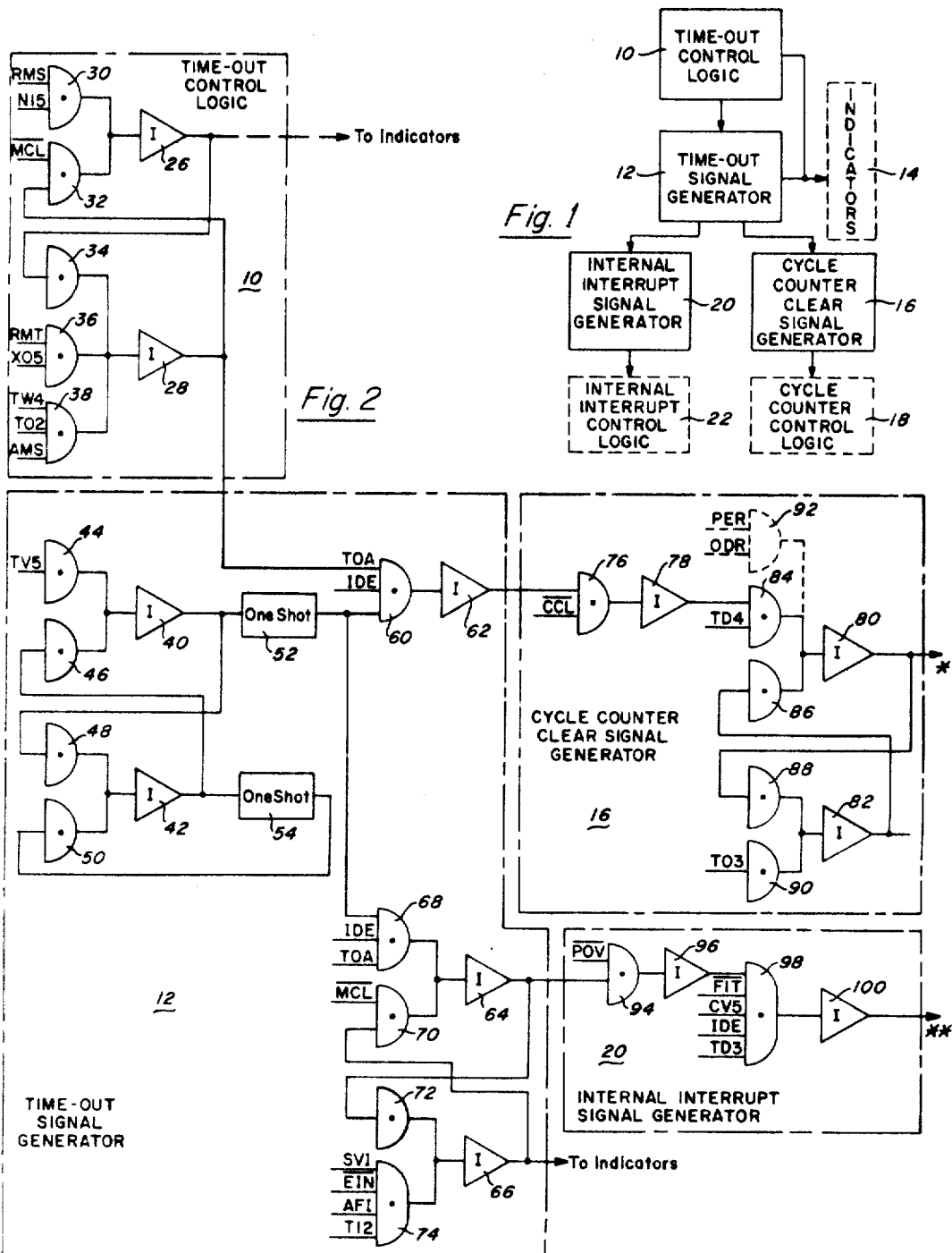

3,426,331
APPARATUS FOR MONITORING THE PROCESSING TIME OF PROGRAM INSTRUCTIONS
Thomas F. Joyce, Melrose, Mass., assignor to Honeywell Inc., Minneapolis, Minn., a corporation of Delaware
Filed Dec. 12, 1966, Ser. No. 600,868
U.S. Cl. 340—172.5      7 Claims
Int. Cl. G11b 27/36

ABSTRACT OF THE DISCLOSURE

An apparatus for monitoring the time duration of program instructions being processed in an associated data processing system and for terminating the processing thereof whenever a predetermined time limit is exceeded. To accommodate this operation, a timing device, having an operating cycle corresponding to the maximum allowable processing time for any one instruction, is conditioned to be recycled by each new instruction and in the absence of a recycling operation is effective in generating an output signal at the termination of its characteristic operating cycle to terminate the processing of the current instruction.

Background of the invention

The present invention concerns an electronic data processing apparatus; and more specifically, means for controlling the processing of program instructions in such a data processing apparatus.

A representative form of data processing system presently known in the art is a multiprogramming system characterized by its ability to perform a multiplicity of operations in connection with a plurality of unrelated functions. The characterizing capability of the multiprogramming system enables the simultaneous processing of a plurality of programs through the successive interleaving of instructions from the respective programs being processed. The multiprogramming capability permits the system to effectively perform "on-line" with respect to a plurality of peripheral input and output devices while at the same time simultaneously carrying on programmed data processing operations without interference. Such a system is disclosed in United States Patent 3,029,414 which issued Apr. 10, 1962 to Henry W. Schrimpf, and is assigned to the assignee of the present invention.

A multiprogramming system of the type described in the above-identified Schrimpf patent may include one or more remote terminal devices connected to the centrally located multiprogramming system by means of communications equipment. In order to facilitate the recognition of access requests from the remote terminal devices to the central processor of the centrally located data processing system, an interrupt arrangement may be provided. The interrupt operation enables otherwise unscheduled central processor requests to be recognized apart from the general order or sequence of recognition extended to instructions of the plurality of programs simultaneously being processed.

A common technique for implementing the interrupt operation is to await the completion of processing of the current instruction whereupon the contents of the sequence counter controlling the normal flow of instructions through the central processor portion of the data processing apparatus will be interchanged with the contents of an interrupt register; the contents of the latter idenifying the nature of the interrupt request. The relatively high speed of the present-day data processing system insures that, in the general case, the processing of the current instruction will be completed in time to insure that none of the incoming information constituting the interrupt message will be lost, notwithstanding the fact that the nature of this latter information is generally non-retrievable.

For purposes of this explanation, the processing of a program instruction may be thought of as comprising two parts: the extraction phase and the execution phase. During the extraction phase of the processing operation, the program instruction is extracted from storage locations in memory and transferred into pertinent registers within the central processor to thereby establish the necessary control signals to effect the actual execution of the instruction. If for some reason during the extraction or execution phase of the program instruction, the program enters an endless extraction or execution loop, it would be impossible for the system to service an interrupt request directed to the system from one of the remote terminal devices during the current processing operation. Under such conditions, the informational content of the interrupt message may be irretrievably lost.

Summary of the invention

It is accordingly, a primary object of the present invention to provide means for monitoring the processing of a program instruction and to terminate the processing thereof upon a determination that an excess amount of time is being spent on the processing of that instruction.

The foregoing object is achieved in a preferred embodiment of the present invention, wherein there is provided a first bistable device having a set and reset state and which also includes means to switch the bistable device to the set state so as to make the associated system responsive to an extended extraction or execution error. The preferred embodiment further includes a second bistable device having outputs, representing its set and reset states, connected to first and second monostable multivibrators. A conditioning signal connected to the second bistable device is responsive to the initiation of processing of each new program instruction to terminate the characteristic operating cycle of a first one of the monostable devices while initiating the operating cycle of the second. In the event that the conditioning signal fails to reoccur within the characteristic operating cycle of the first monostable device, a signal is generated at the output of the first monostable device upon the successful completion of its characteristic operating cycle, which signal, when combined with a signal indicating that the system is responsive to an over-time error condition, is effective in terminating the processing of the present program instruction.

It is therefore another more specific object of the present invention to provide timing means in association with the instruction processing portion of a data processing device whereby each instruction may be given the maximum processing time in which to complete its extraction and execution operations and, wherein the timing means comprises a one-shot multivibrator connected to the control circuit in such a manner that it is automatically reset at the extraction of each new instruction; however, should the characteristic operating cycle of the monostable multivibrator be expended prior to the initiation of the processing of the next succeeding instruction, associated control circuitry will be effective in terminating the processing of the current instruction. The foregoing objects and features of novelty which characterize the present invention as well as other objects of the invention are pointed out with particularity in the claims annexed to and forming a part of the present specification. For a better understanding of the invention, its advantages and specific objects allowed with its use, reference should be had to the accompanying drawing and description matter in which there is illustrated and described a preferred embodiment of the invention.

Brief description of the drawing

FIGURE 1 is a diagrammatic showing of the present invention; and,

FIGURE 2 is a detailed showing of the logic used in implementing the present invention.

Description of the preferred embodiment

The apparatus diagrammatically illustrated in FIGURE 1 comprises the basic time-out control logic 10 which functions, when conditioned, to generate a time-out allow signal indicating that the system is operative in the time-out mode. A time-out signal generator 12 functions as a continuously operating clock to monitor the time duration of a program instruction being processed. Upon a determination that the processing time exceeds a predetermined limit, the outputs from the time-out control logic 10 and the time-out signal generator 12 are effective in generating signals to clear the cycle counter and initiate an interrupt operation.

The outputs of both the time-out control logic 10 and time-out signal generator 12 are independently connected to indicators 14 which are provided to store off an indication of the logical conditions existing at the time of an interrupt operation. In this respect, the function served by the indicators is consistent with the logical organization of most conventional data processors having an interrupt capability. The storing off of the conditions existent in the various registers of the central processor at the time of an interrupt operation insures that the pertinent information will be available when the interrupted program is resumed.

As indicated above, the function of the output signal from the time-out signal generator 12 is twofold in that steps are taken to initiate a clearing of the cycle counter and other registers of the CP, as well as to effect an interrupt operation. Accordingly, one of the outputs from the time-out signal generator 12 is connected as an input to a member denoted herein as a cycle counter clear signal generator 16 which may be connected to the clear logic normally associated with a data processing apparatus. Thus, the output of the cycle counter clear signal generator 16 is shown as being connected to the cycle counter control logic 18 of a conventional data processing system. A signal to the cycle counter control logic 18 results in a resetting of the cycle counter to thereby enable the subsequent memory cycle to be directed to the extraction of a new instruction.

The other output from the time-out signal generator 12 is connected to internal interrupt signal generating logic, depicted herein as member 20. The output of member 20 is in turn connected to the internal interrupt control logic 22 of a conventional data processing apparatus. In the preferred embodiment of the present invention, the termination of processing of a particular instruction, upon an indication that the processing time has exceeded a predetermined limit, results in the initiation of an internal interrupt operation wherein the monitor or executive program ascertains the cause of the interrupt and stores off the information from the indicators 14, whereafter normal processing is resumed.

Before proceeding with an explanation of the operation of FIGURE 1, reference is made to FIGURE 2 which illustrates in diagrammatic logical detail the preferred implementation of the apparatus of FIGURE 1. The time-out control logic 10 comprises a bistable circuit which is adapted to be switched between its set and reset states in accordance with any one of a plurality of inputs connected thereto. The bistable circuit is of a conventional nature and may be of the type disclosed in the patent to Betz which issued Oct. 26, 1965 as Patent No. 3,214,695. As such it is formed using a pair of inverters 26 and 28 which have AND gates 30 through 38 connected as inputs thereto. AND gates 32 and 34, connected to the outputs of inverters 26 and 28 respectively, function as feedback or recirculation gates for the output signals from the inverters. Thus, the output of inverter 26 is cross-coupled to the input gate 34 whose output is buffered to the input of the inverter 28. The starting input signal is derived at AND gate 30 through the combination of the signals RMS and a signal N15.

The RMS conditioning signal corresponds to a subcycle of the reset variant indicator or RVI cycle, which broadly controls the setting and resetting of the time-out allow function. In the co-pending application of Thron et al. bearing Ser. No. 521,865, filed Jan. 29, 1966, an explanation is given of a character-oriented data processing apparatus which utilizes an auxiliary Op code modifier register to store off pertinent control information to be used in the processing of a particular instruction. During the RVI cycle, an appropriate bit location of a register such as the above-mentioned auxiliary Op code modifier register of the Thron et al. apparatus is sensed to ascertain whether the time-out allow function is operative in the processing of the present instruction. In order for the time-out allow function to become operative, AND gate 30 senses the status of the pertinent register location, identified herein by the N15 signal, during the RMS portion of the RVI cycle. The successful conditioning of AND gate 30 terminates the output from inverter 26 and by means of the feedback loop through AND gate 34, effects an output from inverter 28.

The input $\overline{MCL}$ to the feedback loop AND gate 32 connecting the output of inverter 28 to the input of inverter 26, is provided to insure that the time-out control logic does not generate a time-out allow signal TOA upon generation of a master clear logic MCL signal, the latter signal being selectively used to clear all registers of the associated data processing system. The other input gates to the inverter 28 are utilized for purposes of resetting the bistable circuit under discussion. Thus, AND gate 36 is effective during subcycle RMT of the RVI cycle to reset the bistable circuit of FIGURE 10 under the control of a variant indicator signal XO5. AND gate 38 is conditioned in the event of an actual time-out interrupt; where, under the control of a store variant indicator SVI cycle, the information in the indicators associated with the time-out control logic 10 is stored and at the same time the time-out allow function is discontinued. The conditioning signals to AND gate 38 include a TW4 machine cycle, a TO2 time pulse and an AMS signal indicative of the storage-resetting operation.

The time-out signal generator 12 comprises a repetitively cycled timing mechanism which further comprises a pair of monostable multivibrators 52 and 54 coupled to the set and reset outputs of a logical recirculation device of the type described above in connection with the time-out control logic 10. In this respect, a pair of inverters 40 and 42 are conditioned by a plurality of AND gates 44 through 50. Each monostable multivibrator or "one shot" 52 and 54 is connected to the output of one inverter 40, 42 respectively. The outputs of the inverters 40 and 42 are further cross-coupled as inputs to the recirculation gates 46 and 48. The output of the one shot 54 is connected as an input to AND gate 50. Once initiated, the operation of the one shot 54 continues until it has cycled through its characteristic operating period. AND gate 44 is conditioned by a signal TV5 which characterizes the first cycle of each new instruction.

The characteristic operating period of each of the one shots 52 and 54 bears an approximate 10 to 1 ratio with respect to the other. The 10 to 1 operating ratio is chosen to facilitate the recovery of the extended duration one shot. In this respect, the ratio corresponds to the known recovery rate for a one shot, which may be expressed in an approximate manner in terms of a fraction of the characteristic operating cycle. Accordingly, the selected ratio should not be construed as a limitation on the operative capability of the present invention. In similar manner, the characteristic operating cycles of the one shot are merely exemplary of values which may be used and as such should not be construed as a limitation.

In the operation of the time monitoring portion of the time-out signal generator 12, each new instruction to be processed initiates the generation of a TV5 signal which after conditioning AND gate 44, is buffered to the input of the inverter 40. At such time the output of the inverter 40 goes "low" and consequently deconditions AND gate 48. This in turn removes the conditioning input to inverter 42 causing the output of the latter to go "high." With the output of inverter 42 high, AND gate 46 is conditioned causing the output of inverter 40 to remain low once the TV5 signal to AND gate 44 is removed.

In addition to conditioning AND gate 46, when the output of the inverter 42 goes high, the characteristic operating cycle of the one shot 54 is initiated. In the preferred embodiment of the present invention, the operating cycle of the one shot 54 remains operative for approximately 25 milliseconds. At the termination of the operating cycle of the one shot 54, an output signal is generated therefrom which passes through the conditioning gate 50 to drive the output of inverter 42 to its low state. With the output of inverter 42 now low, the AND gate 46 is no longer conditioned so that the output of inverter 40 goes high. At this time, the actuation of the one shot 52 is initiated. The delayed actuation of the one shot 52 in response to the input signal TV5 is meant to insure the complete recovery of the one shot from its preceding operating cycle. The operating cycle of the one shot 52 extends for some 200 milliseconds. If during this period the processing of a new instruction is commenced, the operation of the one shot 52 is terminated and the timing cycle is initiated anew. If, however, the processing of a new instruction is not initiated during the characteristic operating cycle of the one shot 52 an output signal is generated from the latter to partially condition AND gate 60.

Other conditioning inputs to the AND gate 60 include the signal TOA indicating that the time-out allow condition is set whereby the system will be responsive to over-time conditions occurring during the processing of program instructions; and, a signal IDE which is used to establish that the system is not operative in the base mode wherein time-out interrupts are normally disregarded. Consistent with the negative logic organization utilized in the description of the present invention, there is associated with the output of the AND gate 60 an inverter 62, the output of which goes low in an instance where AND gate 60 is properly conditioned.

The output signal from the one shot 52 in combination with the signals TOA and IDE also function as conditioning inputs to AND gate 68; which, in combination with inverters 64 and 66 and gating devices 70 through 74, form a logical bistable device of the type described above with respect to the time-out control logic 10. As indicated above, AND gate 68 is responsive to the same conditioning signals as AND gate 60. AND gates 70 and 72 constitute part of the recirculation logic utilized to effect a lockup of the bistable circuit under discussion whenever the latter assumes one or the other of its two states in accordance with conditioning signals on the inputs to AND gates 68 and 74 respectively. The AND gate 74 is conditioned by a plurality of signals including the signal SVI, which as explained above with respect to the time-out control logic 10, corresponds to a store variant indicator cycle which, in addition to initiating the storage of information currently contained in specific registers of the apparatus, may also be used to initiate a resetting of the corresponding registers. The signal EIN is effective in this regard in initiating the actual interrupt cycle by storing off an indication of the current condition in a particular bit location of the variant storage register. The signal AFI indicates that the present interrupt operation is not being initiated in response to an external interrupt request. The signal T12 designates the timing subinterval over which the resetting operation is effected.

It was earlier established that the function of the time-out signal generator 12 was twofold in that upon detection of an overextension of the processing time, a signal is generated which initiates the clearing of the cycle counter and other register locations and also effects a demand interrupt whereby the monitor routine initiates an inquiry as to the cause of the current interruption. These two functions are independently served by the cycle counter clear signal generator logic 16 and the internal interrupt signal generation logic 20.

The preferred embodiment of the present invention is utilized in conjunction with an apparatus of the form described in the above-mentioned Thron et al. copending application and as such is able to make use of portions of the existing logic thereof, into which a signal generated at the output of the inverter 62 may be connected to initiate a signal for clearing the cycle counter. To this end, AND gate 76 is provided which is conditioned in part by the output from inverter 62 and also by a signal $\overline{CCL}$ which establishes that the current cycle counter clear operation is not being initiated in response to a central clear operation such as may be initiated at the console of the associated data processing system. The output of AND gate 76 conditions an output from the inverter 78 which in turn is connected as an input to AND gate 84, the latter being one of a plurality of conditioning gates associated with a cross-coupled bistable device of the type described above. In this respect, the balance of the bistable circuit associated with the cycle counter clear signal generator 16 comprises inverters 80 and 82 along with a plurality of conditioning gates 84 through 92.

In addition to the conventional recirculation gates 86 and 88 and the reset gate 90 conditioned by signal TO3, actuation of the bistable device under discussion may also be effected by a combination of signals PER and ODR representing respectively a tie-in to the existing logic and an out-of-range parity violation. The significance of gate 92 is minimal with respect to the invention under discussion; however, it is of interest to note the manner in which the present invention may be tied in with a conventional data processing system. The output of the inverter 80 is effective upon generation of an output signal in either AND gate 84 or 92, to direct a signal to the cycle counter logic portion to effect the resetting thereof and the dissemination of similar signals to other portions of the associated data processing system such as the floating point and multiply-divide units to effect a resetting operation therein.

The output from the inverter 64 of the time-out signal generator 12 may likewise be connected into the existing logic structure of a system designed to accommodate the present invention and as such the origin of the interrupt demand is distinguished in AND gate 94 by the conditional gating signal $\overline{POV}$ corresponding to another type of interrupt; namely, a privileged $Op$ code violation. The output of the AND gate 94 is conducted through an inverter 96 to form one of a plurality of inputs to AND gate 98. Additional inputs to AND gate 98 include a signal $\overline{FIT}$ which establishes that the current interrupt operation is not of an external nature such as might be initiated from a peripheral device or a communications unit; a signal CV5 corresponding to the extraction portion of the V5 time cycle; the signal IDE which establishes that the system is presently operative in the user mode and not in the base mode under the control of the monitor routine which, as has been indicated above, ignores interrupts of this nature when operative in this mode; and a signal TD3 which is representative of the timing subinterval under which the conditioning of AND gate 98 is effected. Upon conditioning of the AND gate 98 the output of inverter 100 goes low thus indicating to the internal interrupt control logic 22 of FIGURE 1, that an interrupt operation is actually to be initiated.

Having now described in detail the logical organization of a preferred embodiment of the present invention, it remains merely to summarize the operation thereof. In this respect with the time-out control logic 10 set so as to be responsive to instruction processing operations of extended duration, the time monitoring portion of the time-out signal generator 12 continues to recycle as the processing of each new programming instruction is initiated. Upon the failure of the system to initiate the processing of a new program instruction within the combined operating cycle of the pair of one shots comprising the time monitoring portion of the time-out signal generator 12, a signal is generated from the output of the extended duration one shot which combines with the time-out allow signal from the time-out control logic 10 to initiate the clearing of the cycle counter and other registers of the processor and also initiate an internal interrupt by the monitor or executive program. These latter operations are effected in the cycle counter clear signal generator 16 and the internal interrupt signal generator 20.

It will be apparent from the foregoing description that there has been provided an apparatus for monitoring the time duration of processing of program instructions and in the event that the processing of a particular instruction extends for an unreasonable time steps may be initiated to terminate the processing of the current instruction. Although originally contemplated for use in monitoring the extraction and execution phases of a single program instruction, the principles of the present invention may well be applied to any system and on an absolute basis with respect to time. In such a system, any single program in a multi-programming environment may be allocated a predetermined time for effecting a sequence of operations in accordance with the programmer's estimation or actual experience as to the time requirements for the processing of the particular segment of a program. If during the processing these pre-established limits are exceeded by some predetermined factor, steps such as those described above may be exercised to terminate the processing operation.

Steps may also be taken to modify the effective time duration of the monitoring means in accordance with the nature of the program instruction being executed. In such a system, the nature of the instruction would dictate the extent of the period afer which interrupt would automatically be initiated. The implementation of this latter feature might make use of a monostable device having a variable operating cycle, or possibly a plurality of monostable devices which could be coded in accordance with the nature of the instruction being processed to effect the desired combination of time elements required to efficiently execute the instruction.

As a further modification, means could be provided to enable a monostable device, responsible for generating the ultimate output signal used to terminate the processing of the current instruction, to be completely responsive rather than, as in the preferred embodiment of the present invention, one which requires an auxiliary monostable device to insure its recovery rate. This latter feature could be implemented by way of duplicated circuitry wherein effective control switches from one circuit to the other upon the alternate execution of program instructions.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. Apparatus for monitoring the time required for processing program instructions in a data processing system including means for terminating the current processing operation whenever the processing time exceeds a predetermined limit, comprising the combination of first means having a characteristic operating cycle and capable of generating an output signal upon the successful conclusion of said characteristic operating cycle, second means responsive to periodic input signals to terminate the operation of said first means prior to the successful conclusion of said characteristic operating cycle, and third means actuated upon detection of an output signal from said first means as generated at the successful conclusion of the operating cycle thereof and in the absence of a terminating signal from said second means to terminate the processing of the current instruction and to initiate an interrupt operation.

2. Apparatus for monitoring the time duration of the processing of a program instruction including means for terminating the processing thereof upon a determination that the processing time has exceeded a predetermined limit; the combination comprising first means for storing an indication that the system is responsive to signals indicating that the duration for processing of a particular program instruction has exceeded said predetermined limit, second means adapted to generate an output signal indicating that said predetermined limit has been exceeded during the processing of the current instruction, and gating means responsive to conditioning signals from said first and second means to initiate the generation of a control signal to effect the termination of the processing of the current instruction.

3. An apparatus for monitoring the time required to process a program instruction in a data processing system whereby a maximum time limit is placed on the duration of time allocated to the processing of any one instruction, comprising the combination of sensing means associated with a control portion of said data processing system, said sensing means being actuated to effect the generation of a control signal upon the initiation of processing of each new program instruction, timing means having said control signal connected as an input thereto, which control signal is effective in resetting said timing means, said timing means being cyclic in nature and designed to generate an output signal upon the failure of said sensing means to sense the initiation of processing of a new program instruction during a particular operative cycle of said timing means, means connected to sense an output signal from said timing means and upon the detection thereof to terminate the processing of the present instruction.

4. An apparatus for use in monitoring the operating conditions within an associated electronic data processing system comprising cyclic timing means having a characteristic operating cycle and adapted to generate an output signal upon the successful completion of said characteristic operating cycle, sensing means responsive to the periodic occurrence of an input signal representative of a condition being monitored, means connecting the output of said sensing means to the input of said timing means to reset said last-named means prior to the successful completion of its characteristic operating cycle and for re-cycling said timing means upon each occurrence thereof, and means connected to the output of said timing means and actuated in response to a signal therefrom to terminate current operations in the associated data processing system.

5. An apparatus for monitoring the time duration of the processing of program segments in an associated data processing system comprising the combination of a first bistable device having set and reset states representative respectively of the responsive or non-responsive nature of said monitoring apparatus to conditions indicative of the extended nature of the processing time allocated to a particular program, sensing means responsive to aperiodically distributed signals representative of the processing status of a program being monitored, timing means connected to the output of said sensing means, said timing means having a characteristic operating cycle, means including said timing means for generating an output signal at the successful conclusion of said characteristic operating cycle, means including said sensing means connected to reset said timing means upon the detection of each of said aperiodically distributed signals representing the processing status of the program being monitored, said timing means being effective in the absence of the detection of a signal in said sensing means indicative of said condition being monitored in generating an output signal which when combined in gating means with a signal from the set side of said first bistable device is further effective in terminating the processing of instructions related to the current program and for initiating an interrupt operation to rectify the current operating condition.

6. An apparatus for monitoring the time required to process a program instruction in a data processing system, including means for terminating the processing of the current instruction whenever the processing time exceeds a predetermined limit, comprising the combination of first bistable means settable in response to a time-out allow signal to thereby condition said system to be responsive to the processing time for a particular program instruction which exceeds said predetermined limit, time-out signal generating means having a characteristic operating cycle and including means for generating a time-out signal upon completion of said characteristic operating cycle, means connected to reset said time-out signal generating means upon the initiation of processing of each new program instruction, gating means partially conditioned by a signal from said means settable in response to a time-out allow signal, said gating means being further conditioned by a signal representing the generation of a time-out signal, a cycle counter clear signal generator having connected as an input thereto the output of said gating means, the output of said cycle counter clear signal generator being effective in initiating a recycling of an associated cycle counter, the output of said gating means being further connected to an internal interrupt signal generating portion which when activated is effective in initiating an interrupt operation whereby recognition is given to the next succeeding program instruction to be processed.

7. An electronic data processing apparatus including means to limit the processing time allocated to any one instruction, the combination comprising a pair of monostable devices, a bistable device having a set and a reset state, means connecting one of said monostable devices to an output representing the set state of said bistable device and the other monostable device to an output representing the reset state of said bistable device, conditioning means connected to the input of said bistable device and activated in response to a signal indicating the initiation of the processing of each new program instruction, said conditioning means when activated being effective in switching said bistable device into said reset state whereby said monostable device connected to the reset side of said bistable device will be reset while said monostable device connected to the set side of said bistable device will be actuated for a time corresponding to the characteristic operating time thereof, means connecting an output from said monostable device connected to the set side of said bistable device upon completion of the characteristic operating cycle thereof to the input of said monostable device connected to said reset side of said bistable device to initiate an operative cycle therein, said monostable device connected to the reset side of said bistable device including means for initiating an output signal therefrom upon successful conclusion of its characteristic operating cycle, and means for sensing the output from said monostable device connected to the reset side of said bistable device to terminate the processing of the present instruction and initiate an interrupt operation.

References Cited

UNITED STATES PATENTS

| | | | |
|---|---|---|---|
| 3,061,192 | 10/1962 | Terzian | 235—157 |
| 3,029,414 | 4/1962 | Schrimpf | 340—172.5 |
| 3,222,647 | 12/1965 | Strachey | 340—172.5 |
| 3,312,951 | 4/1967 | Hertz | 340—172.5 |
| 3,323,109 | 5/1967 | Hecht | 340—172.5 |
| 3,331,055 | 7/1967 | Betz | 340—172.5 |
| 3,333,252 | 7/1967 | Shimabukury | 340—172.5 |
| 3,099,818 | 7/1963 | Murray | 340—172.5 |

PAUL J. HENON, *Primary Examiner.*

I. S. KAVRUKOV, *Assistant Examiner.*